US008656282B2

(12) United States Patent
Kulas

(10) Patent No.: US 8,656,282 B2
(45) Date of Patent: Feb. 18, 2014

(54) AUTHORING TOOL FOR PROVIDING TAGS ASSOCIATED WITH ITEMS IN A VIDEO PLAYBACK

(75) Inventor: Charles J. Kulas, San Francisco, CA (US)

(73) Assignee: Fall Front Wireless NY, LLC, Dover, DE (US)

( * ) Notice: Subject to any disclaimer, the term of this patent is extended or adjusted under 35 U.S.C. 154(b) by 354 days.

(21) Appl. No.: 11/669,901

(22) Filed: Jan. 31, 2007

(65) Prior Publication Data

US 2008/0184121 A1     Jul. 31, 2008

(51) Int. Cl.
*G06F 3/00* (2006.01)

(52) U.S. Cl.
USPC ......................................................... 715/723

(58) Field of Classification Search
USPC .................................. 715/723, 748; 345/473
See application file for complete search history.

(56) References Cited

U.S. PATENT DOCUMENTS

| 5,528,266 | A | * | 6/1996 | Arbeitman et al. | ............ | 345/173 |
| 5,734,862 | A | * | 3/1998 | Kulas | ............................. | 711/157 |
| 5,825,675 | A | * | 10/1998 | Want et al. | ..................... | 708/142 |
| 5,929,849 | A | | 7/1999 | Kikinis | | |
| 6,049,827 | A | * | 4/2000 | Sugauchi et al. | ............. | 709/223 |
| 6,339,789 | B1 | | 1/2002 | Sugauchi et al. | ............. | 709/223 |
| 6,441,362 | B1 | * | 8/2002 | Ogawa | .......................... | 250/221 |
| 6,490,620 | B1 | * | 12/2002 | Ditmer et al. | ................. | 709/224 |
| 6,580,870 | B1 | | 6/2003 | Kanazawa et al. | | |
| 6,982,716 | B2 | * | 1/2006 | Kulas | ............................. | 345/473 |
| 7,027,101 | B1 | | 4/2006 | Sloo et al. | | |
| 7,106,381 | B2 | * | 9/2006 | Molaro et al. | ................. | 348/468 |
| 7,360,149 | B2 | * | 4/2008 | Janakiraman et al. | ........ | 715/201 |
| 7,877,689 | B2 | | 1/2011 | Gilley | | |
| 2002/0078446 | A1 | | 6/2002 | Dakss et al. | | |
| 2002/0107829 | A1 | * | 8/2002 | Sigurjonsson et al. | ........... | 707/1 |
| 2002/0131511 | A1 | * | 9/2002 | Zenoni | ..................... | 375/240.28 |
| 2002/0138831 | A1 | * | 9/2002 | Wachtfogel et al. | ............ | 725/32 |
| 2004/0008227 | A1 | * | 1/2004 | Kulas | ............................. | 345/772 |
| 2004/0189868 | A1 | * | 9/2004 | Molaro et al. | ................. | 348/468 |
| 2005/0031315 | A1 | | 2/2005 | Kageyama et al. | | |
| 2005/0086690 | A1 | | 4/2005 | Gilfix et al. | | |
| 2005/0171964 | A1 | * | 8/2005 | Kulas | ............................. | 707/100 |
| 2005/0278747 | A1 | * | 12/2005 | Barton et al. | .................... | 725/58 |
| 2006/0122842 | A1 | * | 6/2006 | Herberger et al. | ............ | 704/278 |
| 2007/0067707 | A1 | * | 3/2007 | Travis et al. | ............... | 715/500.1 |
| 2007/0294622 | A1 | | 12/2007 | Sterner et al. | | |

(Continued)

OTHER PUBLICATIONS http://en.wikipedia.org/wiki/Adobe_After_Effects; "Adobe After Effects"; 4 pages; Apr. 28, 2010.

(Continued)

*Primary Examiner* — Sara England
*Assistant Examiner* — Angie Badawi

(57) ABSTRACT

An authoring tool for post-production insertion of tags and pointers into a video sequence is disclosed. Such an authoring tool can facilitate tag and pointer coordinate capture and tracking by using position detection (e.g., via a touchscreen) coupled to a display system. In one embodiment, a method can include: (i) selecting a video frame loop for viewing on a display device; (ii) receiving a list of tags for positioning within the selected video frame loop; and (iii) positioning a selected tag from the list of tags in one or more frames of the video frame loop. Also, the method can include positioning a pointer corresponding to the selected tag in the one or more frames.

22 Claims, 5 Drawing Sheets

(56) References Cited

U.S. PATENT DOCUMENTS

| | | |
|---|---|---|
| 2008/0034295 A1 | 2/2008 | Kulas |
| 2008/0109881 A1* | 5/2008 | Dasdan .............................. 726/4 |
| 2008/0154908 A1 | 6/2008 | Datar et al. |

OTHER PUBLICATIONS http://en.wikipedia.org/wiki/Adobe_Flash; "Adobe Flash"; 20 pages; Apr. 28, 2010.

U.S. Appl. No. 11/499,315, filed Aug. 4, 2006.

Butler, Phil, Mojiti—Testing for Fun, Profy, http://profy.com/2007/01/29/mojiti-bubbles/ (Jan. 29, 2007).

De Rossi, Luigi Canali Subtitling and Dubbing Your Internet Video, http://www.masternewmedia.org/news/2007/02/06/subtitling_and_dubbing_your_internet.htm (Feb. 6, 2007).

Mojiti Video in Your Own Words, http://web.archive.org/web/20071009074408/http://mojiti.com/learn/personalize (Oct. 9, 2007).

Silberberg, Yoni, "New BubblePly.com Website Allows Users to Add Creative Layers on Top of Online Video," Jan. 29, 2007, http://bubbleply.com (4 pages).

* cited by examiner

AUTHORING TOOL FOR PROVIDING TAGS ASSOCIATED WITH ITEMS IN A VIDEO PLAYBACK

CROSS-REFERENCE TO RELATED APPLICATION

This application is related to co-pending U.S. patent application Ser. No. 11/499,315 filed on Aug. 4, 2006 entitled "DISPLAYING TAGS ASSOCIATED WITH ITEMS IN A VIDEO PLAYBACK" which is hereby incorporated by reference as if set forth in this application in full for all purposes.

SUMMARY OF EMBODIMENTS OF THE INVENTION

In particular embodiments, an authoring tool can be provided for insertion of tags into a video sequence. Tags can include text and graphics and a pointer or other mechanism for associating a tag to an item in the video sequence. The authoring tool can facilitate tag and pointer coordinate capture and tracking by using position detection of an author's hands, fingers, author-operated stylus, etc., detected, for example, via a touch screen coupled to a display system.

In one embodiment, a method can include: (i) selecting a video frame loop for viewing on a display device; (ii) receiving a list of tags for positioning within the selected video frame loop; and (iii) positioning a selected tag from the list of tags in one or more frames of the video frame loop. Also, the method can include positioning a pointer corresponding to the selected tag in at least one frame.

In one embodiment, an apparatus for authoring can include: (i) a display screen having a digitizing tablet coupled thereto, the display screen being configured to show a video frame loop; and (ii) user controls coupled to the display screen, the user controls being configured to enable placement of a selected tag and a corresponding pointer within one or more frames of the video frame loop.

In one embodiment, a system can include: (i) a display device that can show a video frame loop; (ii) a video frame loop control coupled to the display device, where the video frame loop control can activate a tag search within a tag database, where the tag database can provide a list of tags for positioning within the video frame loop; and (iii) a means for positioning a selected tag from the list of tags in one or more frames of the video frame loop.

DETAILED DESCRIPTION OF EMBODIMENTS OF THE INVENTION

Conventional approaches for advertising via a video sequence include direct product placement in a scene. Product placement uses an image of an item to be advertised included in a scene in the video production, program, sporting event, or other content. However, one problem with product placement is that the item must be shown in enough detail, clarity and for enough time so that a viewer will be adequately presented with the item for advertising purposes.

One approach to product placement includes providing additional information such as text, graphics or other information in association with an item in a video scene. The information can be in the form of a "tag" that can be shown in a tag mode that is selectable by a viewer by using a control such as a television remote control unit. Such an approach is described, for example, in the co-pending patent application referenced above.

Tags can provide information about items, and the tags may be visible during video playback, during a broadcast video program, during video play on a computer platform, or via other types of video playing or presentation. Tags can identify a brand name, item name, location where an item can be purchased, and/or additional information about the item. Various features presented herein allow creation or authoring of the tags or other types of information so that tags can be inserted into, or defined in or with, video or other visual content.

A typical form of video playback for a user or viewer can include a Digital Video Disc (DVD) player. Further, a multi-angle feature of the player may be used to allow a viewer to switch between tagged and non-tagged playback. In normal or non-tagged playback, tags may not be visible, and an original video sequence (e.g., a television program, movie, etc.) can be played in typical fashion. When a viewer presses a button, a new video sequence that includes tags may be selected. The new video sequence can be synchronized to an original video sequence so that the effect can be that tags appear over continuous action of the original video sequence. The viewer can turn off the tags by selecting an original sequence, for example. Other forms or mechanisms for playback can be used to achieve the same or a similar effect.

Tags can be organized and displayed according to categories, such as "design," "gadgets," "scene," or any other suitable category. For example, the design category can display tags that deal with fashion, interior/exterior decorating, architecture, art, and similar types of items. The gadgets category can include electronics, appliances, cars, etc., and the scene category can provide information on colors, furniture, plants, locations, climate, or the like. Other categories can be created, as desired, and tags of a specific category can be selected for independent display. Alternatively, categories can be combined to display tags from multiple categories on a same display.

Figure 1:
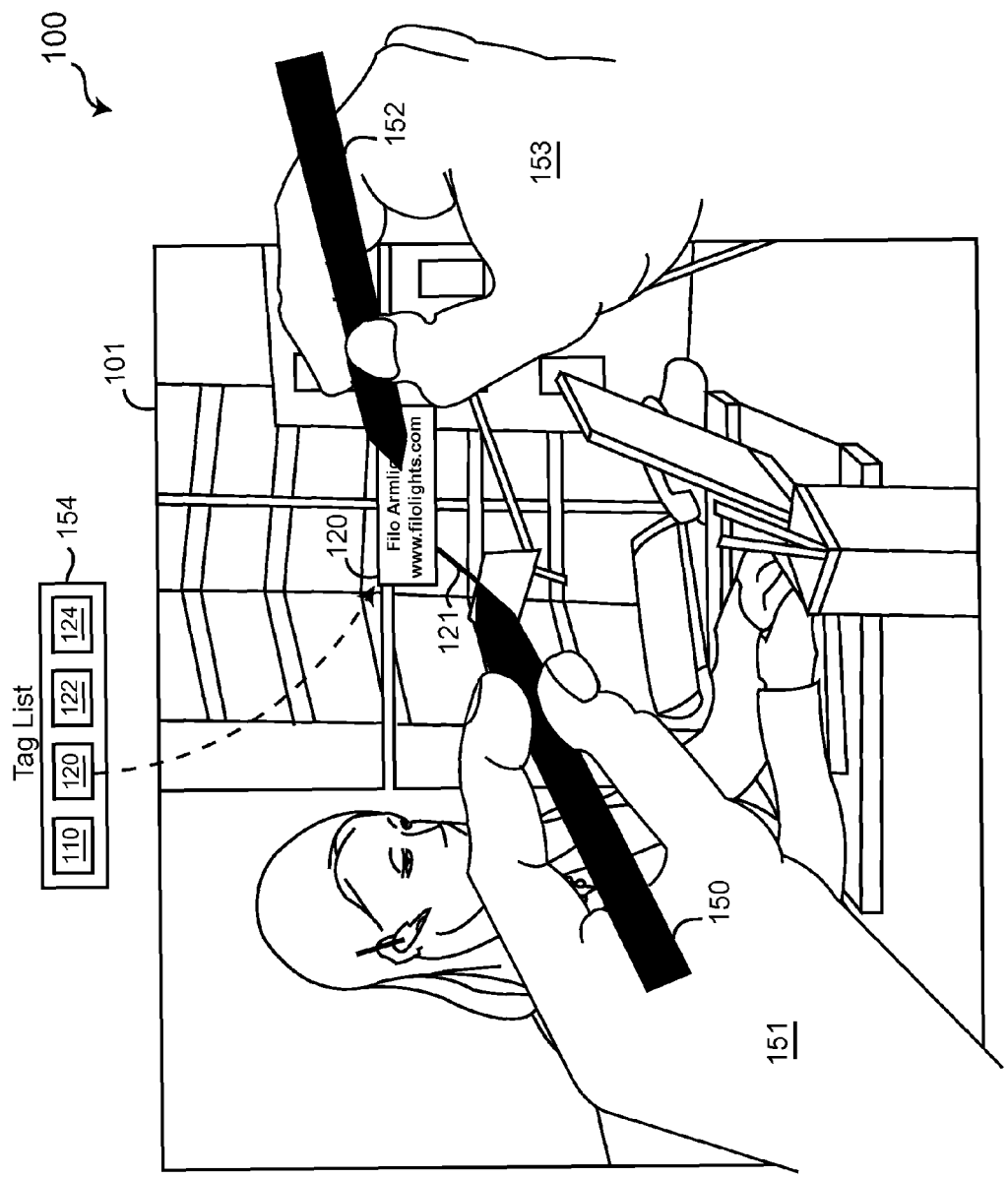
FIG. 1 shows an example tag and pointer positioning in a single frame.

Referring now to FIG. 1, an example of a user interface for a tag authoring tool is shown. A main video window 101 is shown on a display screen along with tag list 154. Tag and pointer positioning is shown and indicated by the general reference character 100. It should be understood that even though a single frame of video is shown, a preferred embodiment of the invention operates while the video is playing back in real time, or in a slower or faster mode. Pausing or still-framing the video is also possible as are various types of standard transport controls such as frame skipping, jogging, etc.

In FIG. 1, the image is of a woman in an office typing at a laptop at her desk while she is also talking on a wireless phone. The video can play with animation and sounds, as is known in the art. Although particular embodiments are discussed primarily with respect to video presentations, any suitable type of visual presentation and/or production processes can be adapted for use with embodiments of the present invention. For example, video, animations, movies, pre-stored files, slide shows, Flash™ animation, etc., can be used with features of particular embodiments. The number and type of attributes or other data included in the tag database can vary, as desired.

In addition, any type of playback device (e.g., computer system, set-top box, DVD player, etc.), image format (e.g., Motion Picture Experts Group (MPEG), Quicktime™, audio-visual interleave (AVI), Joint Photographic Experts Group (JPEG), motion JPEG, etc.), display method or device (e.g., cathode ray tube (CRT), plasma display, liquid crystal display (LCD), light-emitting diode (LED) display, organic light-emitting display (OLED), electroluminescent, etc.) can be utilized in accordance with particular embodiments. Further, any suitable source can be used to obtain playback content, such as a DVD, HD DVD, Blu-Ray™ DVD, hard disk drive, video compact disk (CD), fiber optic link, cable connection, radio-frequency (RF) transmission, network connection, etc. In general, the audio/visual content, display and playback hardware, content format, delivery mechanism and/or other components and properties of the system can vary, as desired, and any suitable items and/or characteristics can be used in particular embodiments.

In FIG. 1, an example tag is shown with text box 120 and lead line or "pointer" 121. The text box can include information relevant to an item that is pointed at by the lead line. For example, tag 120 states "Filo Armlight www.filolights.com" to point out the manufacturer ("Filo"), model ("Armlight"), and website (www.filolights.com) relating to the light to which tag 120 is connected via its lead line. Other tags, such as 110, 122 and 124, as shown in tag list 154, can provide information about other items in the frame.

Tags can include any type of interesting or useful information about an item, or about other characteristics of the image frame or video scene, to which the image frame belongs. Note that more, less, or different, information can be included in each tag, as desired. Further, tags can be organized into different categories that can be selectively displayed.

Tag designs can vary and may use any suitable design property. Typically, it is desirable to have the tags be legible and convey a desired amount of information, while at the same time being as unobtrusive as possible so that viewing of the basic video content is still possible. Different graphics approaches, such as using colors that are compatible with the scene yet provide sufficient contrast, using transparent or semi-transparent windows, or the like, can be employed. Tag placement can be chosen such that the tag overlays areas of the video that may be less important to viewing. For example, a blank wall could be a good placement of a tag, while an area over a character's face would usually not be a good placement.

Tag shape, color, position, animation, size, use of a pointer, logo, or other graphic, are some of the tag characteristics that can be modified. Many different factors can affect these tag characteristics. If a specific factor, such as aesthetics, is given priority then a graphic artist or scene coordinator can be used to match the look and behavior of tags to a theme of a scene or overall presentation. For example, where a scary movie is tagged, the tag design can be in darker colors with borders having cobwebs, blood, ritual symbols, etc., while for a science fiction episode, the tags can be made to look futuristic.

If an advertising factor is given priority, then tags from a preferred sponsor (e.g., someone who is paying more for advertising) can be presented in bolder text, brighter colors, made larger, or made to overlap on top of other tags, etc. A tag database can be utilized to store tag information, such as priority or other suitable attribute information for each tag.

In FIG. 1, tag list 154 can include all tags relevant to a given scene, video frame, sequence or section, or other segment of content that is currently being authored. The author can select or define a segment of video and if predefined tags are available the predefined tags for the segment, or the current frame being displayed, are shown in the tag list. For example, tag list 154 can include tags 110, 120, 122, and 124, for inclusion into the frame shown. These tags can be the ones that appear in the currently displayed frame, or that appear within a window or time interval about the current frame. For example, a search of the tag database can be performed dynamically as the author plays the video so that tags that are appearing or that will appear are displayed in a tag list that updates along with video playback. The tag database can include tag timing information such that a tag list (e.g., 154) can be generated from the database for any frame or set of frames, as chosen by an author. Tag timing information can include time codes for when the tag is to appear in the video, frame identifiers for identifying frames in which the tag is visible, etc. Each tag entry in the database can include associated timing information that can be used to update the tag list as the author navigates forward and backward through the video segment. Provision can also be made for the author to create a new tag that is not in the displayed tag list. However, a preferred embodiment of the invention predefines all the tags prior to the tag placement step.

The tag list can include miniature versions (i.e., "thumbnails") of the tags to be placed. Any format for the tag list can be used. Tags can be identified by a name and one or more attributes in a column or list. The selection of a tag from the tag list can be by any suitable means such as by selecting and dragging a tag from the list with a pointer or stylus. Any suitable way of selecting a tag can be adapted for use with the present invention.

FIG. 1 illustrates a human author's left and right hands as 151 and 153, respectively. In the particular example of FIG. 1, a right-hand stylus 152 held in the right hand can be used to position text box or tag 120, once tag 120 has been selected from tag list 154. Also, left-hand stylus 150 held in left hand 151 can be utilized to position the associated pointer or end of lead line 121 of tag 120 to contact the lampshade item for the light shown in the video frame. Note that these controls can be varied as the left hand stylus can move the tag box while the left hand stylus moves the end of the tag pointer. It may be desirable to position the tag and pointer end one-at-a-time. In other words, the tag position can be placed in a first pass of the video while the tag's pointer end is positioned in a second pass of the video. A preferred embodiment of the invention allows an author to select between positioning tag box, tag pointer, or both at the same time.

Any type of pointing and detection mechanisms can be used. An author's fingers might be used instead of styli (or a combination of a finger and a stylus) although some positioning, particularly pointer endpoints, require more exact pointing than may be possible with an author's finger. The object doing the pointing can be detected by a touch or pressure sensitive screen or array. Other types of detection can be used such as radio frequency, infrared, acoustic, etc., modes of detection. A pointing device such as a mouse, trackball, etc., can be used. A robotic arm can be manipulated and the position of the arm determined by mechanical sensors. The display device need not be a display screen but can include any means of presenting visual content such as by three-dimensional or virtual reality goggles, holograms, projected images, etc.

In general, any of a tag's characteristics can be modified in accordance with one or more factors. For example, keyboard or menu commands can be provided for changing the color of a tag, text font style and size, text box and pointer design, etc.

As a scene changes, such as when characters or objects move through or within the scene, when the camera changes angles, when there is a cut to another scene, etc., tags can also change according to a tag behavior.

In typical operation, an author is able to loop a video segment in normal or slow motion. The author manipulates the tag text box position and pointer endpoint while the segment loops and the coordinates of the box position and pointer endpoint position are recorded and associated with the frames being displayed at a time of capturing the positions. The recorded position information is used later to render the tags within the video and to capture, record, or otherwise associate the tag and tag behavior with the video.

Tag placement can be automated or semi-automated. For example, image recognition techniques can be used to keep a pointer end at a specific object, or to keep a text box away from particular objects (e.g., faces or other items of interest in the scene). Voice or foot controls can be used to allow an author to operate transport controls (e.g., pause, play, fast/slow forward, fast/slow reverse, stop, etc.). Any suitable manner of controlling the interface is acceptable such as mouse/pointer, motion or gesture detection, menu selection, having a second author assist, etc.

Figure 2:
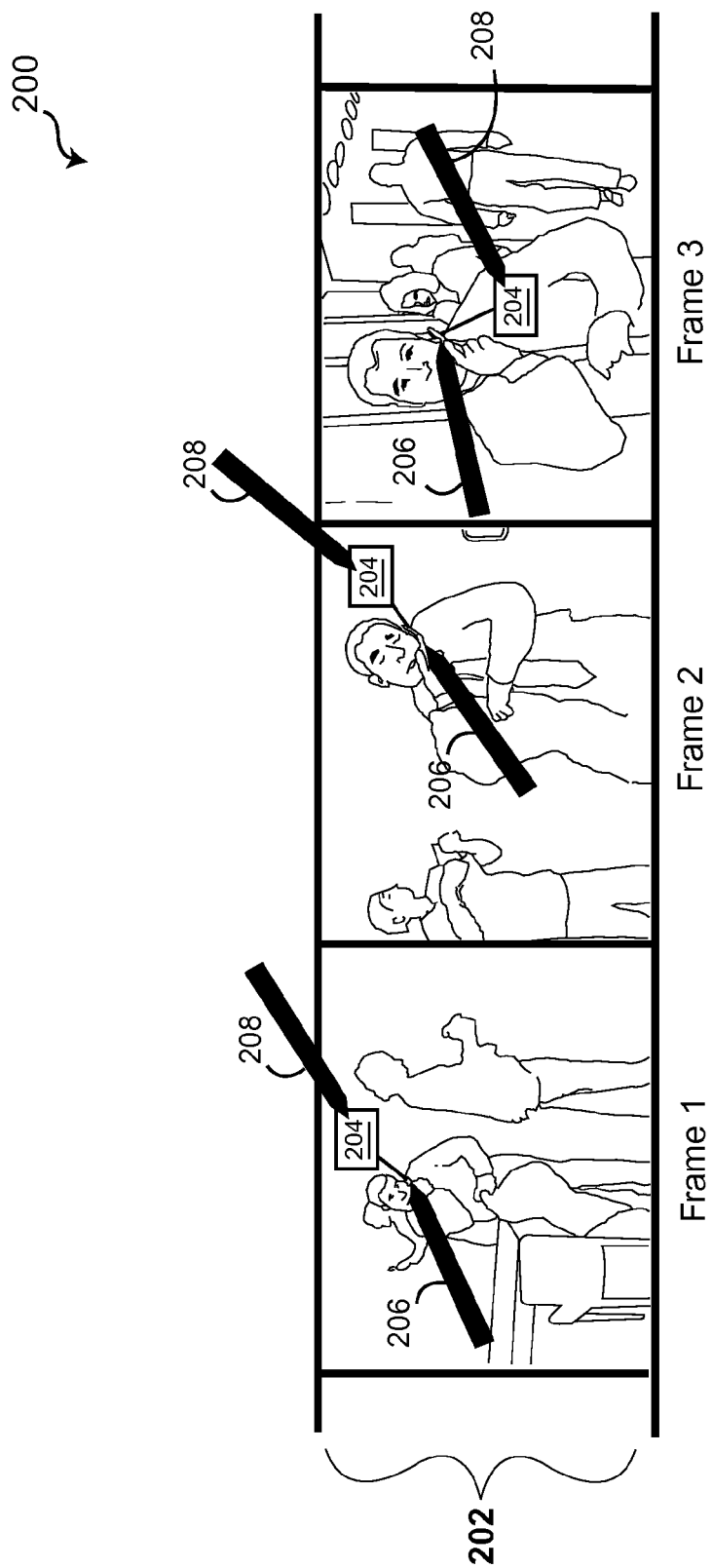
FIG. 2 shows an example tag and pointer positioning in a video frame loop.

Referring now to FIG. 2, an example tag and pointer positioning in a sequence of video frames in a video segment is shown and indicated by the general reference character 200. For clarity, only the styli are shown and the author's hands are not illustrated. In this particular example, gadget tag sequence 202 shows a video clip with a gadget tag (e.g., for a cell phone) added. In particular embodiments, a path or flow of tag positioning from one frame to a subsequent frame can be captured. For example, a positioning of tag 204 in Frame 1 can be followed by a positioning of tag 204 in Frame 2, and tag 204 in Frame 3.

Each tag and pointer positioning can be done using a finger or stylus, for example. In FIG. 2, a left-hand stylus 206 can be used to place the pointer or end of lead line for tag 204 for each frame. Similarly, a right-hand stylus 208 can be utilized to place the tag 204 in each frame. Also in particular embodiments, a size of text box 204, as well as any character effects or animations, can also be modified by use of a finger or stylus.

A progression of time is shown as three snapshots along the horizontal axis. As is known in the art, this method of showing video animation on paper uses one or a few "key frames" to show progression of the action. In actuality, the video clip or loop represented by the three key frames may include hundreds or thousands of frames displayed over a few or many seconds of time. Any number and type of frames can be used. Further, any suitable format, frame resolution, compression, codec, encryption, enhancement, correction, special effects, overlays or other variations, can be used in particular embodiments. In addition, aspects or features described herein can be adapted for use with any display technology, such as three-dimensional renderings, multiple screens, screen sizes and shapes, etc.

A tag display position for an end user can be derived via pre-stored coordinates that may be associated with frames in the video sequence. In particular embodiments, the pre-stored coordinates can be captured during the authoring process by use of user controls (e.g., by a capture/record control), and finger or stylus positioning. Each such coordinate set can be associated with a particular tag by using a tag identification (ID) number, tag name, or other suitable identification or means. In general, any suitable presentation system can be used to provide a user interface (e.g., display effects and user input processing) for authoring tag and pointer positioning in particular embodiments. Captured coordinates can be saved in association with the frames to which they correspond. Captured coordinates can be deleted for retry attempts to capture more desirable coordinates. In general, the captured coordinates can be processed in a similar manner to traditional data or metadata used in connection with playback of a video segment.

Coordinate capture can include tag location on a screen, and where a pointer or a lead line ends on the screen. In particular embodiments, a system can create associated graphics and/or text content based on the tag and pointer coordinates. In particular embodiments, a video loop of frames can be chosen by way of selecting start and end points for the video frame loop by utilizing a foot pedal control, or other suitable means, for example.

A text box can be positioned over a plurality of frames by using one stylus and/or one hand/finger, while a pointer can be positioned over some or all of those frames by using another stylus and/or other hand/finger, for example. The view of a video frame loop can be repeated with text box and pointer capture attempts until the author is satisfied that the text box and pointer positioning are appropriate for the given video frame loop. However, in many cases the tags may not move from one video frame to the next. Thus, only one stylus or finger may move in concert with a particular loop in order to define the pointer, for example. In any event, the system can follow and/or form a path from an author's stylus movements to capture tag, and possibly associated pointer, positioning from one frame to the next in particular embodiments.

For tracking, several user or author controls can be utilized in particular embodiments. For example, such controls can include: play video, mark start/stop points, vary speed, capture/record, setting the tag location, and/or setting pointer location or path. Also, as discussed above, position detection in particular embodiments can be by any means, such as via a touchscreen with a person's finger or stylus, radio-frequency sensing of two or more points, a robotic positioning arm mechanism whereby the author's position is mechanically sensed, an image capture or recognition system, or any mouse or other pointing device.

In particular embodiments, a tag can be generated instantly and seen by an author on a display screen. Multiple passes over the same video sequence can be performed in order to place multiple tags one-at-a-time. In placing multiple tags, previously captured text box and pointer positions and animations can remain on the screen to ensure that subsequently placed tags will not obscure the previously placed tags. Alternatively, an author can selectively turn views of tags on or off, while cycling through a video frame loop.

In addition, the author can designate tags to be in certain categories. For example, when a video frame becomes excessively cluttered with tags of a certain category, one more of those tags can be moved to another category (e.g., from "gadget" to "style"), or to another page in the same category. Further, an author can add any suitable information to tags, such as attributes, priority, or category, or any value for playback, organization, or management/control of the tags.

Figure 3:
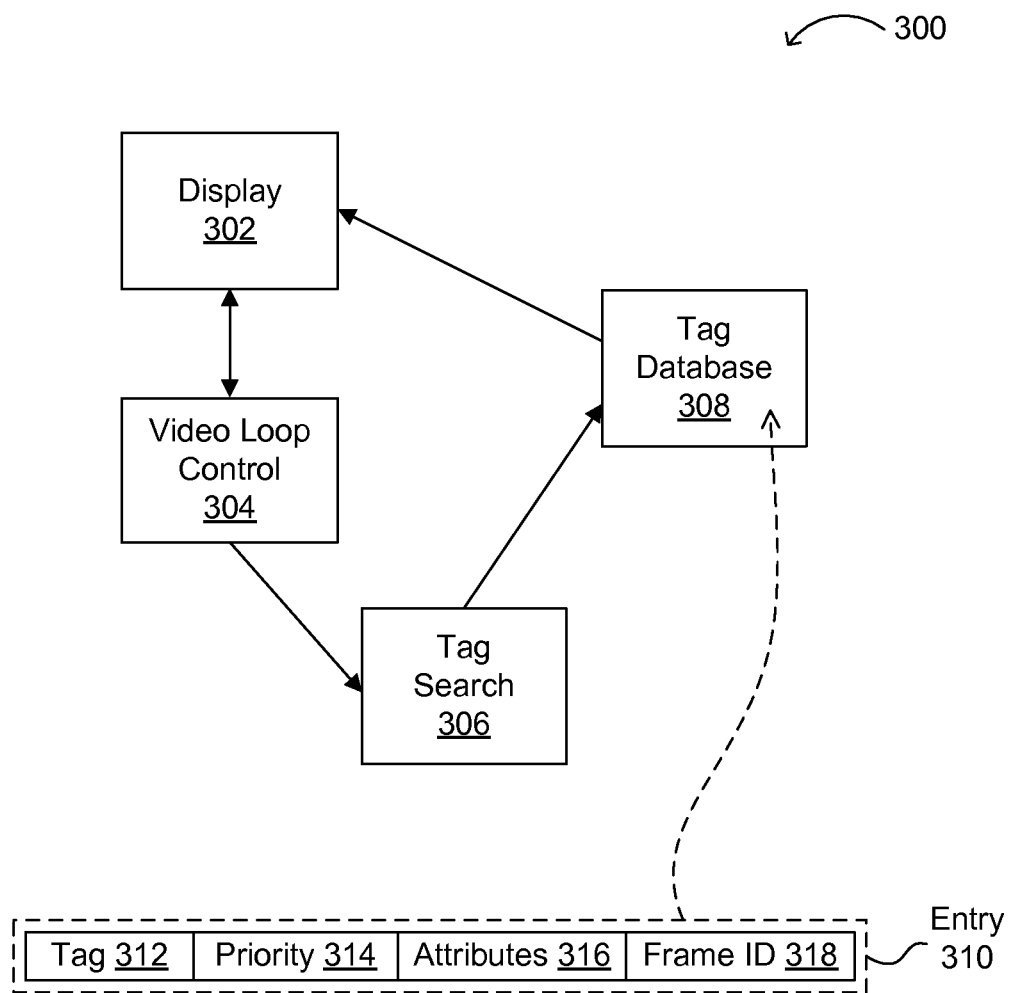
FIG. 3 shows an example system for tag and pointer authoring.

Referring now to FIG. 3, an example system for tag and pointer authoring is shown and indicated by the general reference character 300. Display 302 can be coupled to video frame loop control 304 and tag database 308. When a particular video frame loop or sequence of frames is selected using video loop control 304, tag search 306 can be activated to access tag database 308.

Each entry 310 in tag database 308 can include tag 312, priority 314, attributes 316, and frame identification (ID) 318, for example. The frame ID can include start/stop data to identify a continuous sequence (or sequences) in which the tag should appear. Tag search 306 and/or tag database 308 can be implemented using any type of memory or storage, such as magnetic media, random access memory (RAM) or content addressable memory (CAM), etc. In any event, tag database 308 can provide a tag list (e.g., via display 302) for an author to place in the selected video frame loop.

In particular embodiments, tags can be selected using a predefined database (e.g., tag database 308) imported into the tag authoring tool, obtained from a website/server, or from any suitable source. In particular embodiments, when an author defines start and end points of a video frame loop, a database (e.g., 308) can be accessed whereby the tags needed for this video frame loop are selected based on timestamps corresponding to the video frames in the loop, for example. Accordingly, the database can include entries having frame IDs (e.g., 318), timestamps, or other designated constraints (e.g., 314 or 316) associated with a video frame.

Tag database 308 can be initialized in a pre-production step whereby a script coordinator can input occurrence of a particular product having a tag in a particular scene, for example. Accordingly, tags related to particular frames, such as for designated time periods and/or appearance in certain video frames (e.g., phone 204 in Frames 1, 2, and 3, of FIG. 2), can be documented during initialization of the tag database.

In particular embodiments, a list of objects (e.g. tag list 154 of FIG. 1) can be displayed on the authoring tool display based on the video frame loop definition via access of a tag database (e.g., 308). As discussed above, there may also be information related to the tag (e.g., priority 314 due to contributions of the sponsor) that may warrant superior positioning on one or more video frames. Or, priority 314 may just indicate a preferred order of entry for the author to follow. In any event, tags that an author can manage may come up automatically (e.g. via tag list 154 of FIG. 1) by consultation with tag database 308.

Figure 4:
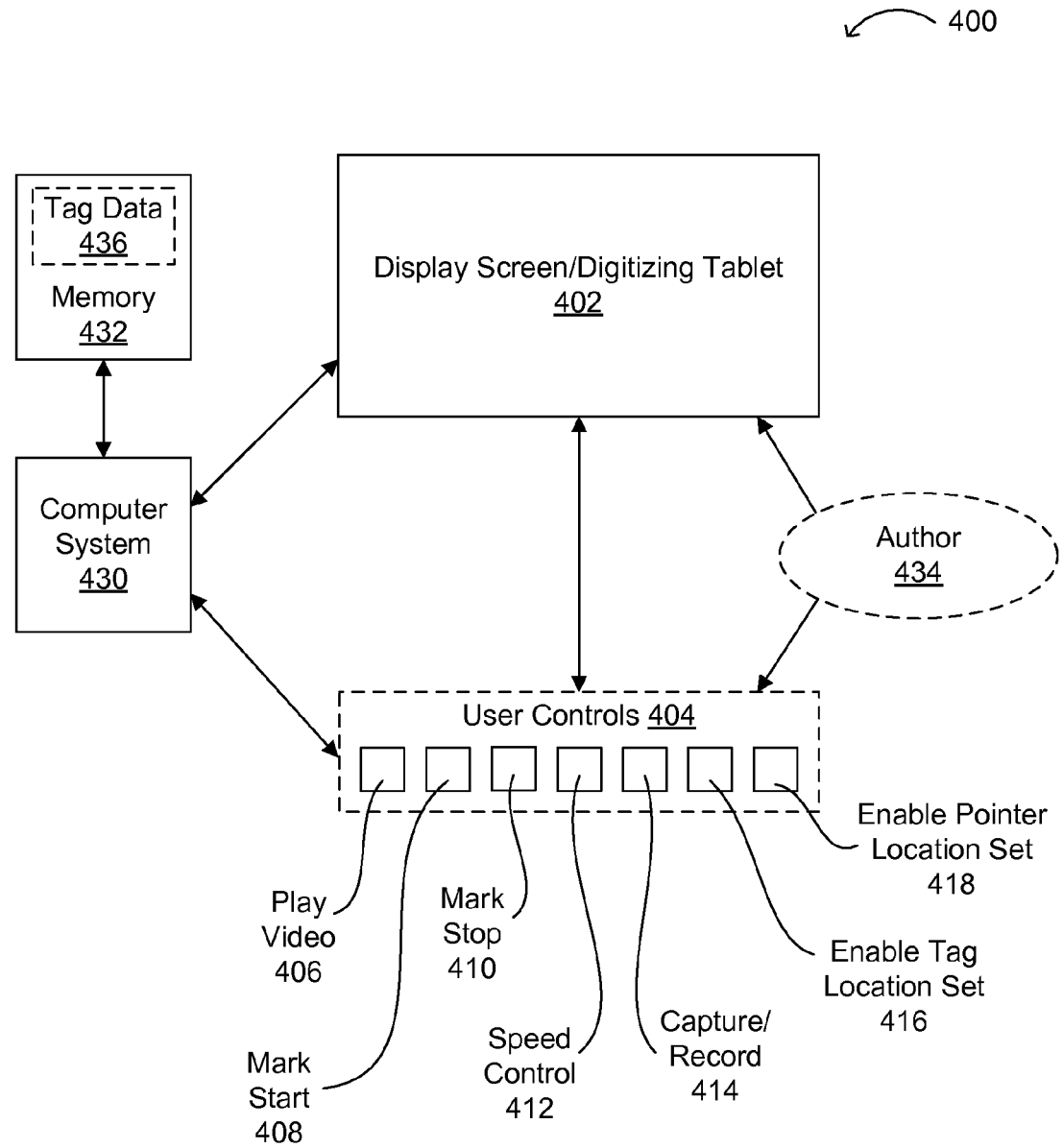
FIG. 4 shows an example system interface for tag and pointer authoring.

Referring now to FIG. 4, an example system interface for tag and pointer authoring is shown and indicated by the general reference character 400. Display screen with digitizing tablet 402 can include, or be coupled to a discrete component for, user controls 404. User controls 404 can include play video 406, mark start 408, mark stop 410, speed control 412, capture/record 414, enable tag location set 416, and enable pointer location set 418.

Play video 406 can control the playing of a video frame loop, while mark start 408 and mark stop 410 can control the definition of that video frame loop. Speed control 412 can be used to control a playback speed of the selected video frame loop to allow for more accuracy in an author's tag and pointer positioning. Capture/record 414 can be used for controlling a saving of a desired tag and/or pointer position for a frame or video frame loop. Enable tag location set 416 and enable pointer location 418 can enable the tracking process for an author to set tag and pointer locations, respectively.

Another component in an authoring system in particular embodiments can be computer system 430, which can interface with display screen/digitizing tablet 402 and user controls 404. Memory portion 432 can also be coupled to computer system 430. Tag data 436 can be stored in memory 432. As discussed above with reference to FIG. 3, tag data 436 (e.g., a database) can include tag identification, priority, attributes, and one or more frame IDs, as just a few examples, in each entry therein. Also as shown in FIG. 4, author 434 can interface with display screen/digitizing tablet 402, as well as user controls 404.

Many other types of hardware and software platforms can be used to implement the functionality described herein. For example, the authoring system can be included in a portable device such as a laptop, personal digital assistant (PDA), cell phone, game console, email device, etc. In such a system, all of the components shown in FIG. 4 might be included in a single device. In other approaches, one or more of the components of FIG. 4 can be separable or remote from the others. For example, the tag data can reside on a storage device, server, or other device that is accessed over a network. In general, the functions described can be performed by any one or more devices, processes, subsystems, or components, at the same or different times, executing at one or more locations.

Figure 5:
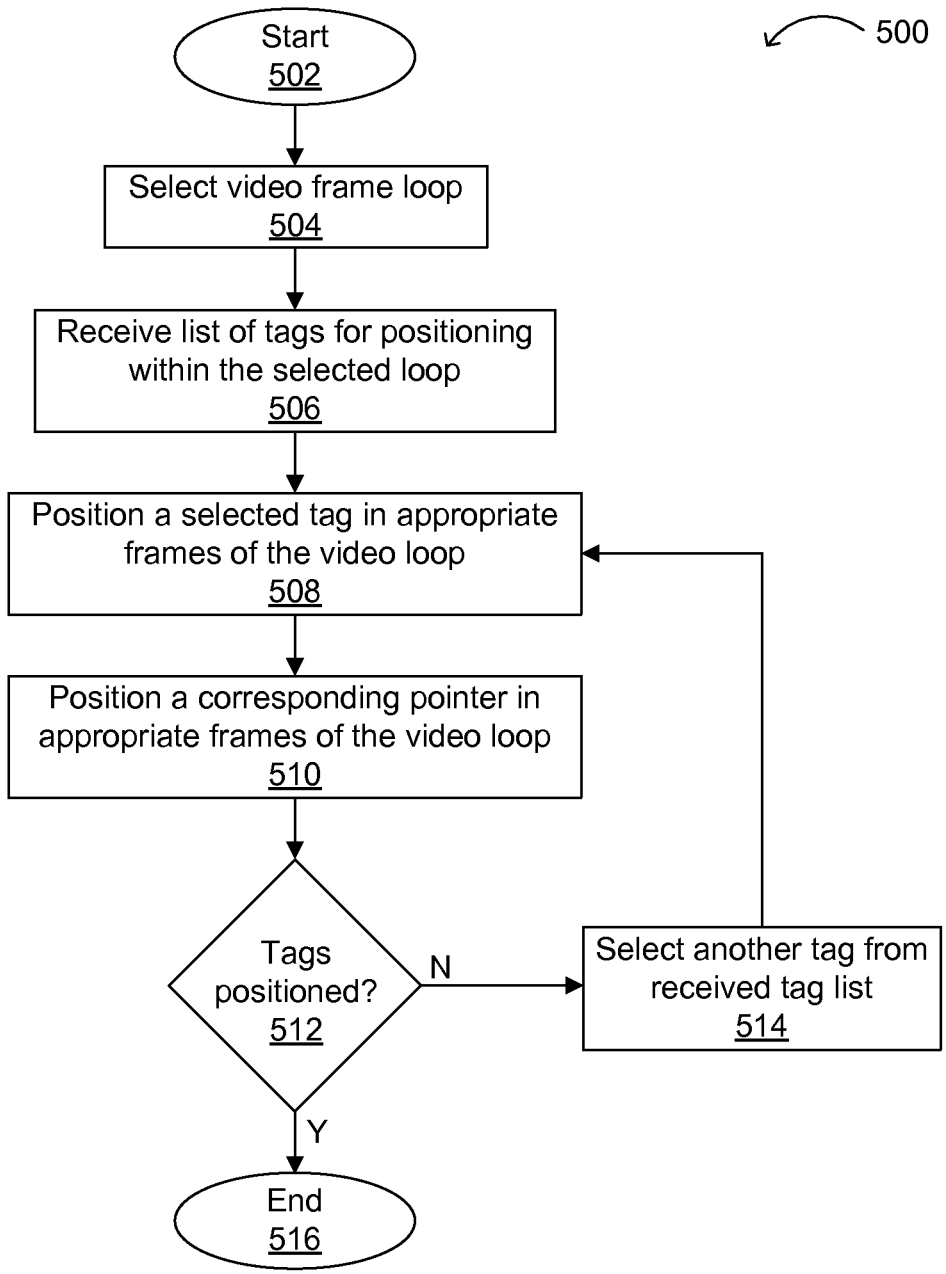
FIG. 5 shows an example tag and pointer positioning flow.

Referring now to FIG. 5, an example tag and pointer positioning flow is shown and indicated by the general reference character 500. The flow can begin (502), and a video frame loop can be selected (504). Next, a list of tags for positioning within the selected loop can be received (506). For example, such a list can be retrieved via a search of a tag database, where the tag database stores frame information along with each tag entry.

A tag can be positioned in appropriate frames of the video loop (508), and a corresponding pointer may also be positioned in one or more frames of the video loop (510). If all received tags in the tag list have been positioned (512), the flow can complete (516). However, if more tags remain in the tag list (512), another tag from the tag list can be selected for placement (514), and this selected tag can then be positioned (508).

Accordingly, particular embodiments can provide an authoring tool that supports automatically capturing, by using motion detection of a human body, the generation of position or animation coordinates for a tag on video. Further, while particular examples have been described herein, other structures, arrangements, and/or approaches can be utilized in particular embodiments.

Any suitable programming language can be used to implement features of the present invention including, e.g., C, C++, Java, PL/I, assembly language, etc. Different programming techniques can be employed such as procedural or object oriented. The routines can execute on a single processing device or multiple processors. The order of operations described herein can be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," "in a particular embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method executed by an authoring device including a processor coupled to one or more user input devices and to a display device, the method comprising the following acts performed during playback of displayed images of a video clip on the display device, wherein the video clip depicts one or more objects that relate to one or more of gadgets, design, or style, the method comprising:

displaying a list of tags, wherein each tag includes text for display during playback of the video clip;

accepting one or more first signals from at least one of the one or more user input devices to select a selected tag that relates to gadgets, design, or style; and accepting one or more second signals from at least one of the one or more user input devices to visually place the selected tag onto the displayed images of the video clip at a selected time and position and to associate the selected tag with at least one of the one or more objects depicted in the video clip, so that during later playback of the video clip on a non-authoring viewer device, the selected tag is displayed at the selected time and position in the video clip and in a manner that visually conveys an association between the selected tag and said at least one of the one or more objects depicted in the video clip.

2. The method of claim 1, wherein the one or more second signals include at least one signal for positioning a lead line from the selected tag to said at least one of the one or more objects depicted in the video clip.

3. The method of claim 2, wherein a first end of the lead line is positioned at least in part by sensing a movement of a first hand of an author.

4. The method of claim 3, wherein a second end of the lead line is positioned at least in part by sensing a movement of a second hand of the author.

5. The method of claim 4, further comprising:
tracking positioning of the first and second hands over time during the playback of the video clip.

6. The method of claim 1, further comprising:
accessing a tag database comprising a plurality of tag entries, each tag entry including the text for display with the tag during playback of the video clip.

7. The method of claim 6, wherein each tag entry in the tag database further includes a priority for the tag relative to other tags in the database.

8. The method of claim 1, wherein a user input device includes a digitizing tablet.

9. The method of claim 1, wherein a user input device includes a touchscreen.

10. The method of claim 1, wherein the selected tag changes location with respect to the video clip, the method further comprising:
tracking a changing location of the selected tag over time during the playback of the video clip.

11. The method of claim 1, further comprising:
varying a play speed of playback of the video clip.

12. The method of claim 1, wherein the playback of the displayed images of the video clip on the video display device comprises repeatedly playing back the video clip in a repeating loop.

13. The method of claim 1, wherein the list of tags comprises thumbnail images of each tag in the list of tags.

14. The method of claim 1, wherein the text for a tag conveys information about one or more objects depicted in the video clip.

15. The method of claim 14, wherein the information comprises one or more items of information selected from the group comprising a manufacturer of the one or more objects, a seller of the one or more objects, a model of the one or more objects, and a website having information relating to the one or more objects.

16. The method of claim 1, further comprising:
accepting one or more third signals from the at least one of the one or more user input devices to specify at least one attribute for the selected tag, wherein said at least one attribute is selected from the group consisting of a shape for the selected tag, a color for the selected tag, a size for the selected tag, and an animation attribute for the selected tag.

17. The method of claim 1, further comprising:
accepting one or more additional signals from the at least one of the one or more user input devices to specify a category in which the selected tag should be categorized.

18. An authoring device comprising:
a processor;
a display device coupled to the processor;
one or more user input devices coupled to the processor;
wherein the processor is configured to perform the following acts during playback of displayed images of a video clip on the display device, wherein the video clip depicts one or more objects that relate to one or more of gadgets, design, or style:
display a list of tags, wherein each tag includes text for display during playback of the video clip;
accept one or more first signals from at least one of the one or more user input devices to select a selected tag that relates to gadgets, design, or style; and
accept one or more second signals from at least one of the one or more user input devices to visually place the selected tag onto the displayed images of the video clip at a selected time and position and to associate the selected tag with at least one of the one or more objects depicted in the video clip, so that during later playback of the video clip on a non-authoring viewer device, the selected tag is displayed at the selected time and position in the video clip and in a manner that visually conveys an association between the selected tag and said at least one of the one or more objects depicted in the video clip.

19. The authoring device of claim 18, further comprising:
a tag database comprising a plurality of tag entries, each tag entry including the text for display with the tag during playback of the video clip and a priority for the tag relative to other tags in the database.

20. The authoring device of claim 18, wherein the text for a tag conveys information about one or more objects depicted in the video clip, and wherein the information comprises one or more items of information selected from the group comprising a manufacturer of the one or more objects, a model of the one or more objects, and a website having information relating to the one or more objects.

21. The authoring device of claim 18, wherein the processor is further configured to accept one or more third signals from the at least one of the one or more user input devices to specify at least one attribute for the selected tag, wherein said at least one attribute is selected from the group consisting of a shape for the selected tag, a color for the selected tag, a size for the selected tag, and an animation attribute for the selected tag.

22. A non-transitory processor-readable storage device including instructions executable by a processor for performing the following acts during playback of displayed images of a video clip on a display device, wherein the video clip depicts one or more objects that relate to one or more of gadgets, design, or style, the non-transitory processor-readable storage device comprising:
instructions for displaying a list of tags, wherein each tag includes text for display during playback of the video clip;
instructions for accepting one or more first signals from a user input device to select a selected tag that relates to gadgets, design, or style; and
instructions for accepting one or more second signals from one or more user input devices to visually place the selected tag onto the displayed images of the video clip at a selected time and position and to associate the selected tag with at least one of the one or more objects depicted in the video clip so that during later playback of the video clip on a non-authoring viewer device, the selected tag is displayed at the selected time and position in the video clip and in a manner that visually conveys an association between the selected tag and said at least one of the one or more objects depicted in the video clip.

* * * * *